May 25, 1943.　　　　J. N. KIRBY ET AL　　　　2,320,138
DRUM CLEANING DEVICE FOR CARVING MACHINE STRUCTURES
Filed Aug. 7, 1941　　　　2 Sheets-Sheet 1
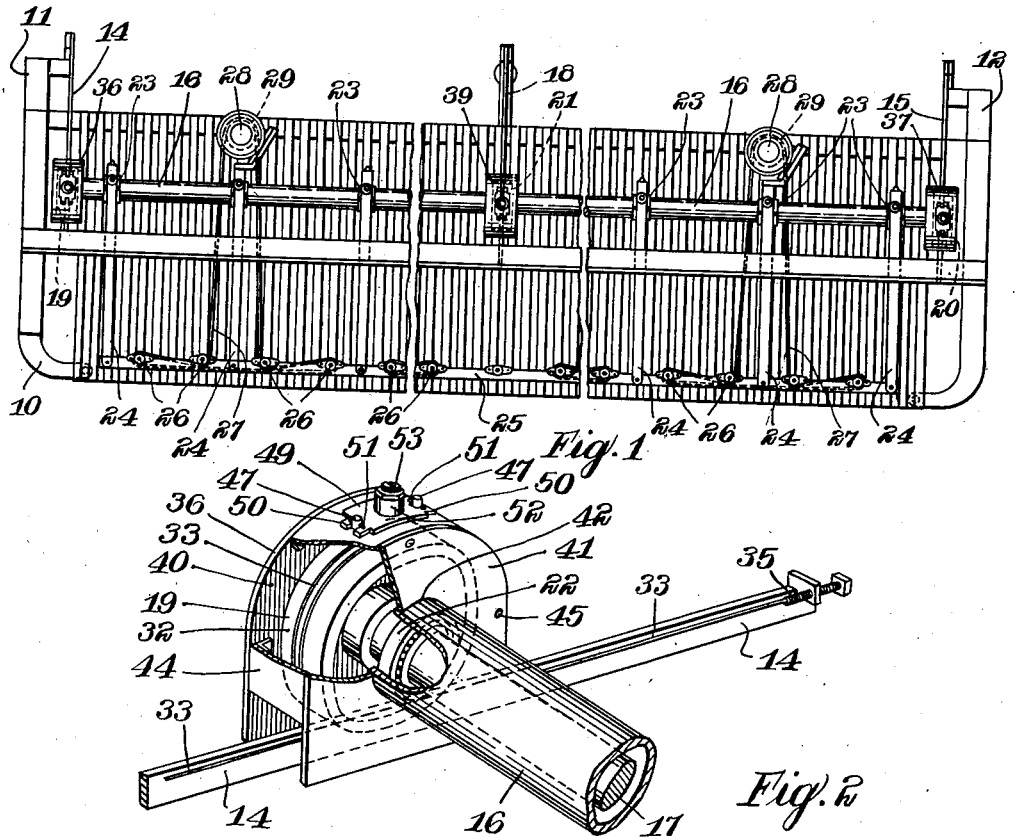
Fig. 1
Fig. 2
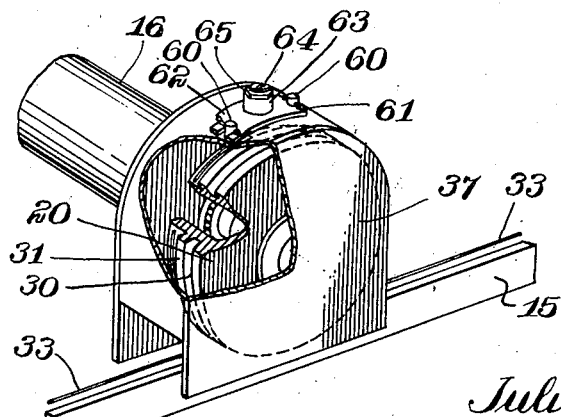
Fig. 3
Julian N. Kirby
Earl W. Grumke
INVENTOR
BY Robert M. Dunning
ATTORNEY May 25, 1943.　　　　J. N. KIRBY ET AL　　　　2,320,138
DRUM CLEANING DEVICE FOR CARVING MACHINE STRUCTURES
Filed Aug. 7, 1941　　　　2 Sheets-Sheet 2

Julian N. Kirby
Earl W. Grumke
INVENTOR

BY Robert M. Dunning
ATTORNEY

Patented May 25, 1943

2,320,138

UNITED STATES PATENT OFFICE 2,320,138

DRUM CLEANING DEVICE FOR CARVING MACHINE STRUCTURES

Julian N. Kirby and Earl W. Grumke, St. Paul, Minn., assignors to St. Paul Machinery Manufacturing Company, St. Paul, Minn., a corporation of Minnesota Application August 7, 1941, Serial No. 405,768

2 Claims. (Cl. 144—137)

Our invention relates to an improvement in a carving machine structure and deals more particularly with an apparatus for maintaining a smooth clean surface on the wheels or drums supporting the shaft bearing the spindle supporting arms.

Machines for carving a multiplicity of articles through the simultaneous action of a series of spindle supported carving tools have been previously constructed. These machines sometimes embody an elongated shaft which supports a series of arms which pivotally connect the shaft to the cutter bar. Such a construction permits movement of the carving tools in any desired direction to follow any desired contour. The elongated shaft is mounted upon wheels or rollers supported on parallel tracks, and means are provided to cause rotation of these wheels or drums in unison in order to maintain the shaft advanced or retracted the same amount at each end. We have found that the tracks over which these drums or wheels are designed to roll and the tracks on which they roll sometimes become crusted with dust and dirt causing a stoppage of the drums and consequently of the whole carriage that is borne by the drums. Any interference with the back and forward movement due to obstacles on the drums interferes with the very important back and forth movement of the machine.

The object of the present invention lies in the provision of an element which frictionally engages the surface of each drum or wheel to insure a smooth surface on the drum and to prevent the building up of a crust of foreign material on the surface thereof.

A feature of our invention resides in the provision of a cylinder which extends in a substantially radial direction with respect to the drum or wheel, and which extends into proximity therewith. Projecting beyond the end of this cylinder, we provide a pad of steel wool, or the like, which engages the surface of the drum or wall and which prevents any foreign material from building up thereupon.

A further feature of our invention resides in the provision of an adjusting means, whereby the pressure of the steel wool upon the drum or wheel may be readily regulated. Thus as wear takes place, it is only necessary to adjust the position of the pad of steel wool or similar material in order to present a new clean surface of the steel wool and to provide the proper tension on this pad.

We have found that even though means be provided to maintain the track as free as possible from foreign matter, that because of the number of tiny particles of wood which are carved from the wooden bodies by the rotating carving tools and because of the pitch and other gummy materials found in the particles of wood, these particles have a tendency to collect on the drum. Accordingly, we have found our cleaning apparatus to be extremely efficient and beneficial for its prescribed purpose.

These and other objects and novel features of our invention will be more clearly and fully set forth in the following specification and claims.

In the drawings forming a part of our specification:

Figure 1 is a top plan view of a carving machine upon which our invention is embodied.

Figure 2 is a perspective detail view of a portion of the carving machine, illustrating the use of our invention.

Figure 3 is a perspective view similar to Figure 2, but showing the opposite end of the carriage from that illustrated in Figure 2.

Figure 4:
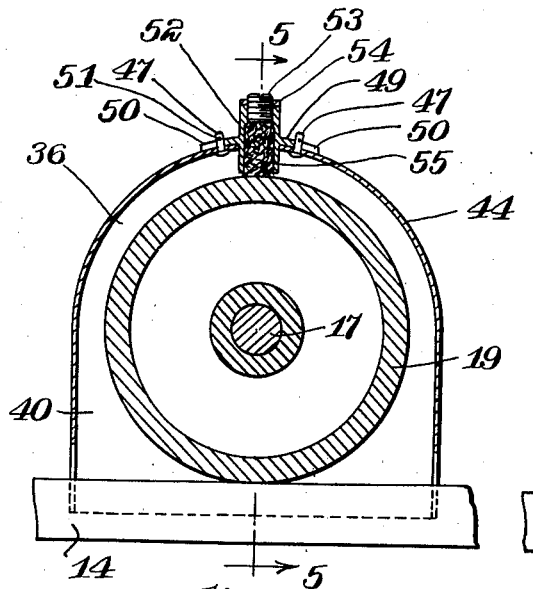
Figure 4 is a cross sectional view taken on a vertical plane through the shaft supporting roller or wheel on one end of the shaft.

The carving machine may be of any suitable or desirable shape, the details of which are not of particular importance in the present application. In the present construction we disclose a carving machine having a frame 10 embodying an end frame member 11 and an end frame member 12, which are connected by suitable frame work. A track 14 is secured adjacent the frame end 11 and a similar track 15 is arranged in parallel relation to the track 14 and is mounted adjacent the frame end 12. When the carving machine is of considerable length, an additional track 18 parallel to the tracks 14 and 15 is provided between the tracks 14 and 15.

A carriage is movably mounted on these tracks 14, 15, and 18. The carriage includes a hollow pipe 16 which extends from the track 14 to the track 18 and is designed to contain the equalizing shaft 17. The shaft 17 is keyed or otherwise secured to a roller 19 at one end thereof, and is keyed or fastened to a roller 20 at the other end thereof. In case a third track 18 is provided on the carving machine an additional roller 21 is provided at the center of the shaft and the shaft 17 may be centrally spliced if desired for convenience in transportation.

A bearing such as 22 is interposed between the shaft 17 and the interior of the pipe 16, adjacent each end thereof, so as to support the pipe 16 from the shaft 17. Obviously if a central roller 21 is provided on the shaft 17, the hollow pipe 16 must be split and both ends of each portion of the pipe 16 must be supported by suitable means from the shaft 17, such as through the use of bearings 22. The pipe 16 is provided with a series of pivoting collars 23, spaced longitudinally thereupon, and these collars 23 are designed to pivotally support arms 24. The arms 24 are pivotally connected to a cutter bar 25 which causes all of the individual arms 24 to pivot in unison. A series of tool spindles 26 are supported by the cutter bar 25 and the various spindles 26 are pivotally rotated by means of belts, such as 27, which extend about pulleys 29 on the motors 28. The belts 27 are illustrated as encircling a series of tool bearing spindles 26, so as to rotate a plurality of spindles in unison. Obviously, however, a special motor and belt may be provided for each individual spindle, or for any desired number of the tool bearing spindles 26.

Figure 7:
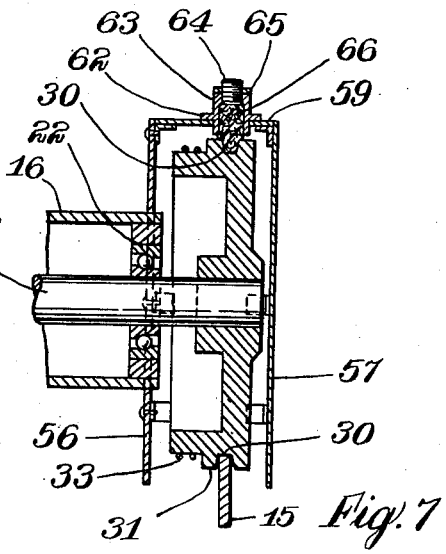
Figure 7 is a sectional view through the roller and housing of Figure 6, the position of the section being indicated by the line 7—7 of Figure 6.

In order to maintain the shaft 17 in proper longitudinal position the roller or pulley 20 is provided with a section 31 of relatively large diameter and a groove 30 is provided in this relatively large diameter pulley portion. As best illustrated in Figure 7 of the drawings, the track 15 engages in the groove 30 and the pulley is guided thereby. Obviously the pulley 20 can not move longitudinally of the carving machine because of this engagement of the track 15 in the groove.

Because of the fact that the pulley 20 can not move longitudinally with respect to the carving machine, it is obvious that the shaft 17 is likewise held from longitudinal movement. The pulley 19 is accordingly constructed with a cylindrical outer surface to engage the track 14. As will be understood the pulley or roller 19 could have a grooved surface similar to that of the roller 20, but in such a case any slight relative angularity of the shaft would tend to cause the roller or pulley to bend with respect to the track. As no advantage is found in providing both of the pulleys with a grooved surface, only one such pulley is provided in the present construction.

The pulley 19 is secured to the shaft 17 by means of set screws or other suitable means and therefore rotates in unison with the pulley 20 as well as the pulley 21. The cylindrical outer surface 32 of the pulley 19 engages the surface of the track 14 and guides the roller or pulley. In order to maintain the rollers 19 and 20 advanced to the same extent on their respective tracks 14 and 15, we provide wire or other flexible connecting means such as 33 connected to the forward and rear ends of the tracks 14 and 15 and connected at their centers to the pulleys 19 and 20. The cord 33 is of sufficient length to permit movement of the drums or rollers 19 and 20 throughout the full lengths of the tracks 14 and 15. One end of the wires or flexible means 33 wraps upon the drum or roller 19 or 20 as the drum or roller moves forwardly on the track, while the other end of the wire or flexible means 33 unwraps from the drum or roller 19 or 20 during this movement. Similarly as the drums 19 and 20 rotate rearwardly on the tracks 14 and 15, one end of each of the wires 33 unwraps from the drums or rollers, while the other ends of the wire or flexible means 33 wrap about the drums. In this manner the rollers are maintained in advanced or retracted position upon the tracks a similar distance at all times.

All of this structure which has been described is common practice and has previously been constructed and disclosed, and accordingly forms no part of the present invention. It will be obvious, however, that the tracks 14, 15, and 18 will sometimes collect dust and dirt because of the considerable amount of saw dust in the air while the carving machine is in operation. It is the practice to provide scrapers to clean the track, but there has not been any provision for cleaning the roller. In order to assist in protecting the drums or rollers 19 and 20 and the roller 21, if such is provided, casings are constructed to enclose these drums or rollers. A casing 36 is provided for the drum 19, a casing 37 is provided for the drum 20, and a casing 39 is provided for the roller 21. The casing 39 connects the separated sections of the pipe 16 when a third roller 21 is employed.

The casing 36 may be of any desired configuration and comprises a pair of parallel plates or walls 40 and 41, the inner of which is provided with a circular aperture 42 to accommodate the pipe 16. The plates or walls 40 and 41 are arcuated on the top surface and are connected by an arcuated connecting band 44 which may be permanently secured to one of the plates or walls, such as 40 and may be removably secured to the other of the plates, such as 41, by means of bolts 45 or other suitable means. The bolts 45 may extend through a flanged edge on the band 44 or through angle clips, such as 46, provided on the band 44 for this purpose. While the plates 40 and 41 may extend below the level of the top of the track 14, it is obvious that the band 44 must terminate somewhat above this track so as to permit the hollow pipe 16 to rotate sufficiently to permit raising and lowering of the spindles 26.

Secured extending through the band 44, we provide a pair of anchoring pins 47 which are positioned in spaced relationship. The arcuated bearing plate 49 is designed to overlie a portion of the arcuated surface of the band 44 and is provided with bifurcated ends 50 which straddle the anchoring pins 47. Locking pins or cotter keys 51 extend through apertures in the anchoring pins 47 and extend over the bifurcated ends 50 to lock the plate 49 in fixed relation to the band 44.

The plate 49 supports a hollow tubular cylinder 52 which extends in a radial direction with respect to the roller 19 and the center of curvature or arcuation of the band 44. The upper end of the cylinder 52 is internally threaded to receive a plug 53. The plug 53 is held in adjusted position by a lock nut 54. The plug 53 is designed to bear against a substantially cylindrical plug 55 of steel wool or similar material, which is urged against the surface 32 of the cylindrical roller or drum 19. This pad of steel wool, or the like, constantly bears upon the surface 32 of the drum 19 and removes any foreign matter from the surface thereof. This steel wool acts effectively to prevent saw dust or other foreign material from caking upon the roller 19.

While the specific construction of the central roller 21 is not disclosed in the drawings, it will be understood that this roller is similar or identical to the roller 19 and that a similar cylinder 52 is applied to the casing 39 to maintain the surface of the roller 21 perfectly clean.

Figure 6:
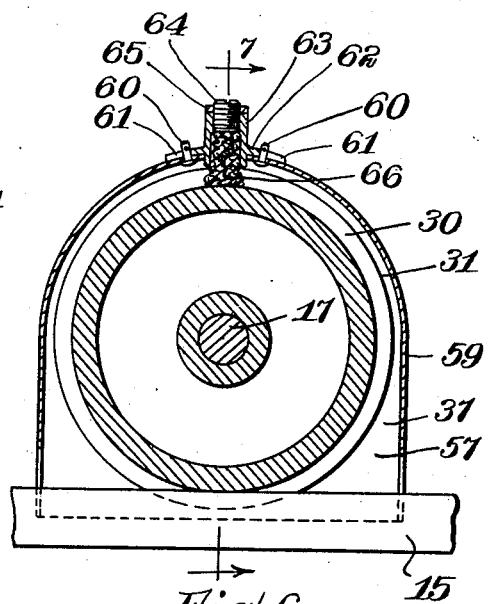
Figure 6 is a cross sectional view similar to Figure 4 showing in section a roller, such as may be used on the opposite end of the carriage shaft.
Figure 5:
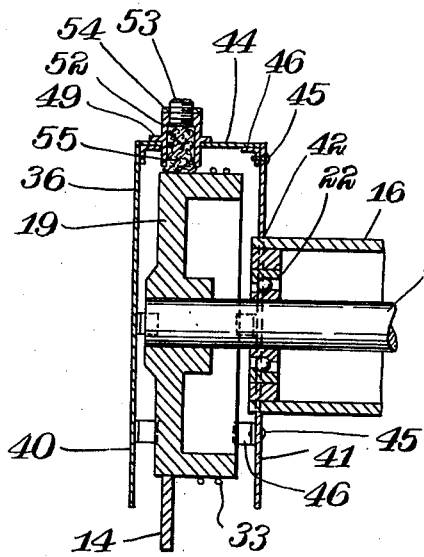
Figure 5 is a sectional view through the roller of Figure 4, the position of the section being indicated by the line 5—5 of Figure 4.

The construction of the casing or housing 37 is best illustrated in Figures 3, 6, and 7 of the drawings. This casing or housing 37 is very similar or identical to the casing or housing previously described in connection with the roller 19. The housing is provided with an inner plate or wall 56 and an outer plate or wall 57 connected thereto by an arcuated connecting band 59. The band 59 terminates short of the track 15 so as not to engage the same as the spindles 26 are raised and lowered. A pair of spaced anchoring pins 60 extend through the band 59 and engage between the arcuated ends 61 of an anchoring plate 62. The anchoring bearing plate 62 supports a cylinder 63 which extends radially with respect to the roller 20. The upper end of the cylinder 63 is threaded to accommodate a plug 64 which is held in place by a lock nut 65. A cylinder or pad of steel wool 66 is provided within the cylinder 63 and extends into the groove 30 on the drum or pulley 20 to keep the surface of this groove perfectly clean and smooth.

In operation the steel wool is inserted in place and urged against the surface of the roller which it is designed to be engaged by the threaded plug 53 or 64. The steel wool keeps the surface of the roller 19 and 20 clear of any irregularities and prevents the building up of foreign material on the drum surface. When the steel wool becomes worn, the plug 53 or 64 may be screwed farther into the cylinder, thus increasing the pressure upon the steel wool and forcing the same again firmly against the roller or drum surface. From time to time the steel wool pad may be replaced.

In accordance with the patent statutes, we have described the principles of construction and operation of our drum cleaning device, and while we have endeavored to set forth the best embodiments thereof, we desire to have it understood that these are only illustrative of a means of carrying out our invention and that obvious changes may be made provided said changes come within the scope of the claims.

We claim:

1. A carving machine having in combination, a frame, a tool carrying member extending longitudinally thereof, a track including a rail extending transversely of said frame, a wheel carrying said member movable on said rail, a casing enclosing said wheel movable with said wheel and member, a hollow cylinder internally threaded at its outer end, said cylinder extending through said casing and having an open inner end adjacent said wheel, a plug having threaded means engageable with said cylinder and accessible from outside said casing, and a wheel cleaning pad within said cylinder and projecting from said inner end into engagement with said wheel and being held in adjusted position by said plug.

2. A carving machine having in combination, a frame, a tool carrying member extending longitudinally thereof, a track including a rail extending transversely of said frame, a grooved wheel carrying said member movable on said rail, a casing enclosing said wheel movable with said wheel and member, a hollow cylinder internally threaded at its outer end, said cylinder extending through said casing and having an open inner end adajcent said wheel, a plug having threaded means engageable with said cylinder and accessible from outside said casing, and a wheel cleaning pad within said cylinder and projecting from said inner end into engagement with the groove of said wheel and being held in adjusted position by said plug.

JULIAN N. KIRBY.
EARL W. GRUMKE.